United States Patent
Joseph et al.

(10) Patent No.: US 6,907,115 B2
(45) Date of Patent: Jun. 14, 2005

(54) METHODS AND DEVICES FOR PROVIDING EARLY DETECTION, CONTROLLED ELIMINATION OF OVERLOAD CONDITIONS AND THE RETURN OF A CONTROLLED LEVEL OF TRAFFIC AFTER SUCH CONDITIONS HAVE BEEN SUBSTANTIALLY ELIMINATED

(75) Inventors: Biju Joseph, Canton, MA (US); Adiseshu Hari, Matawan, NJ (US); Mehmet Karaul, Geneva (CH); Sneha Kasera, Eatontown, NJ (US); Robert A. Latimer, Dennis, MA (US); Catherine R. Loader, Beachwood, OH (US); Jose Carlos Pinheiro, Chatham, NJ (US)

(73) Assignee: Lucent Technologies, Murray Hill, NJ (US)

( * ) Notice: Subject to any disclaimer, the term of this patent is extended or adjusted under 35 U.S.C. 154(b) by 189 days.

(21) Appl. No.: 10/447,925

(22) Filed: May 30, 2003

(65) Prior Publication Data

US 2004/0240645 A1 Dec. 2, 2004

(51) Int. Cl.$^7$ .......................... H04M 15/00; H04M 7/00
(52) U.S. Cl. ............................. 379/112.04; 379/112.03; 379/112.1; 379/221.03; 379/111
(58) Field of Search .......................... 379/111, 112.01, 379/112.03, 112.04, 112.05, 133, 137, 139, 221.01, 221.03; 370/230, 232, 235, 235.1

(56) References Cited

U.S. PATENT DOCUMENTS

| | | | | |
|---|---|---|---|---|
| 5,067,074 A | * | 11/1991 | Farel et al. | 709/235 |
| 5,881,137 A | * | 3/1999 | Ginzboorg et al. | 379/112.04 |
| 6,252,950 B1 | * | 6/2001 | Duty et al. | 379/111 |
| 6,826,268 B2 | * | 11/2004 | Adams | 379/112.04 |
| 2004/0240384 A1 | * | 12/2004 | Hari et al. | 370/230 |

OTHER PUBLICATIONS

Higuera, J.A.G. and C.D. Berzosa, Progressice Method of Overload Control for Processors, Dec. 31, 1979, Laboratorios ITT de Standard Electrica, S.A., Madrid, Spain, pp. 1–8.*

* cited by examiner

*Primary Examiner*—Quoc Tran

(57) ABSTRACT

Overload conditions affecting a processor of a network switch or the like are substantially eliminated, and the processing of traffic is gradually allowed to increase, by inserting, and then monitoring one or more probes which are placed into a queue of the processor. During a given measurement interval, if the number of probes exceeds a threshold then an overload condition exists. This condition is subsequently reduced using "multiplicative decrease" techniques. Conversely, if the threshold is not exceeded and there is little or no chance an overload condition can quickly reappear, traffic is allowed to once again be processed gradually using "additive increase" techniques.

18 Claims, 6 Drawing Sheets

| n | ≤ 3 | 4 | 5 | 6 | 7 | 8 | ≥ 9 |
|---|---|---|---|---|---|---|---|
| b(n) | 1.0 | 0.98 | 0.98 | 0.97 | 0.95 | 0.75 | 0.5 |

FIG. 2

METHODS AND DEVICES FOR PROVIDING EARLY DETECTION, CONTROLLED ELIMINATION OF OVERLOAD CONDITIONS AND THE RETURN OF A CONTROLLED LEVEL OF TRAFFIC AFTER SUCH CONDITIONS HAVE BEEN SUBSTANTIALLY ELIMINATED

BACKGROUND OF THE INVENTION

So-called "network switches" are used to route both signaling and data traffic through a network. These switches are sometimes exposed to sustained periods of high traffic. When the traffic volume is very high, a network switch is "overloaded". Arriving "service request messages" will experience high delays and arbitrary "throttling, resulting in reduced throughput. When a switch becomes overloaded the end customers of a service provider (e.g., telephone company) usually see the effect because the service they expect is adversely affected.

The challenge, therefore, is to develop techniques for minimizing or controlling switch "overloads". In particular, within each switch there are one or more processors (collectively referred to as "processor") that may become overloaded. It is essential that techniques be developed which respond to, and quickly eliminate overloads that may occur.

Existing techniques are available to control processor overloads. One such technique is referred to as Occupancy. Generally speaking, this technique requires the calculation of "occupancy" values in order to determine how "occupied" a processor is at a given interval of time. Depending on the calculated occupancy values, an overload condition is determined to exist or not. If one exists, steps are taken to reduce the overload condition. However, Occupancy-based techniques have their disadvantages. First, calculating occupancy values is easier said than done. Second, Occupancy-based techniques are slow in responding to sudden overload conditions. Third, existing occupancy techniques are subject to recurring overloads because, once an overload condition is removed, they allow too much traffic to build up too quickly. This is also true for other existing overload control techniques not just Occupancy-based techniques. What is needed is a more controlled return of traffic when overload conditions are substantially eliminated or cease.

Accordingly, it is desirable to provide easy-to-implement techniques that provide for the elimination of overload conditions and a controlled return of traffic after such conditions are substantially eliminated.

SUMMARY OF THE INVENTION

The present invention provides techniques for substantially eliminating overload conditions and controlling the return of a level of traffic by placing one or more probes into a queue comprised of incoming data. The data may be signaling instructions or actual message-related data. After a measurement interval, the number of probes is detected and compared to a threshold number. Depending on the results of this comparison, a "fraction allowed" is updated. The fraction allowed is: (a) reduced by a multiplication value when the detected number exceeds the threshold; (b) increased by an additive value when the detected number is equal to zero and a residual delay of a last inserted probe is less than a minimum residual delay; or (c) maintained at a "present" fraction allowed when the detected number is greater than zero and less than, or equal to, the threshold or when the detected number is equal to zero and the residual delay of the last inserted probe is greater than the minimum residual delay. By so controlling the fraction allowed over-load conditions are quickly eliminated, and the return of traffic is gradually increased to prevent sudden reoccurrences of such conditions.

Other features and aspects of the present invention will become apparent from the drawings, detailed description of the invention and claims that follow.

BRIEF DESCRIPTION OF THE DRAWINGS

FIG. 2 depicts some multiplication values that may be applied to a fraction allowed to eliminate overload conditions according to embodiments of the present invention.

DETAILED DESCRIPTION OF THE INVENTION

Figure 1:
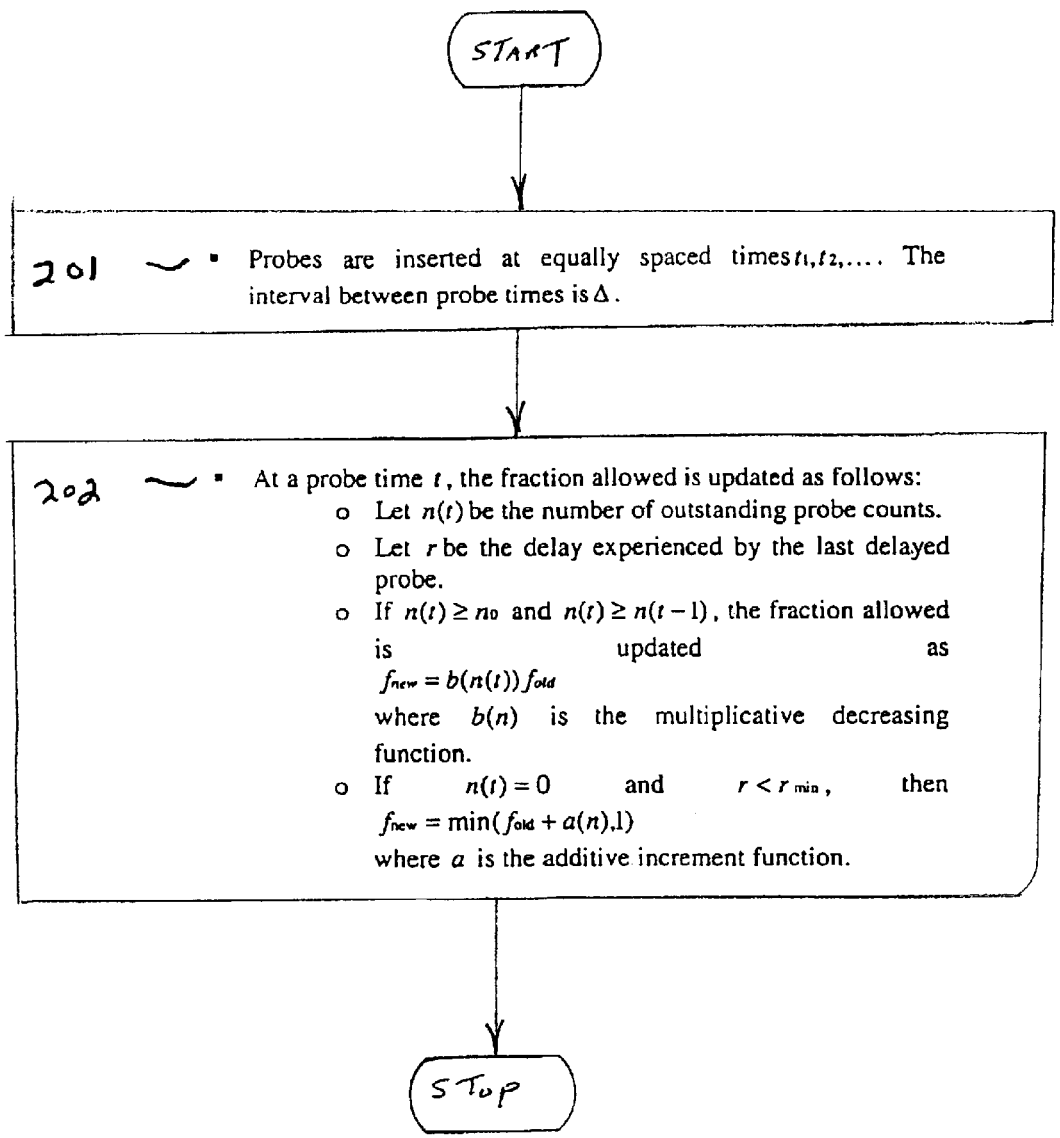
FIG. 1 depicts a flow diagram of a technique that provides a controlled traffic flow and elimination of an overload condition according to one embodiment of the present invention.

Prior to discussing the details of the present invention, it is first necessary to discuss a concept referred to as "fraction allowed". Greatly simplified, the fraction allowed is a value which represents the fraction of new calls that will be allowed to be processed by a processor. Throughout the discussion below, the fraction allowed will be denoted by the symbol, f Because the amount of traffic directed at a processor changes over time, f is a time varying variable. Under normal operation, however, when a switch is not overloaded f is given the value of 1. This indicates that all calls directed at a particular processor are accepted for processing. Generally speaking, the present invention can be described as follows.

First, one or more "probes" are placed into a preprocessing queue or the like (e.g., an Integrated Services Digital Network User Part, (ISUP), queue). The probes act as data "markers" or indicators inserted into the queue among signaling instructions or actual message-related data (collectively referred to as "data"). Both the data and probes are retrieved by a processor to carry out the processing of incoming information. Though one processor may be responsible for retrieving signaling data from more than one queue, the present invention only requires the use of one of these queues to determine whether an overload condition exists or not. In one embodiment of the present invention, each probe comprises a packet or some other equivalent indicator.

After one or more probes have been inserted into a queue, the next step is to detect a number of probes after a measurement interval. In one embodiment of the present invention, each probe may be inserted into the queue after a set time period (referred to sometimes by the symbol "Δ"). Once the number of probes is detected, the detected number is compared to a threshold number to determine if an overload condition exists.

The concept of detecting an overload condition by detecting a number of probes is based on the realization that as a processor begins to process signaling instructions in the queue it will eventually reach the position occupied by a probe. The assumption is that all of the instructions prior to the probe's position in the queue will be completed/processed before the probe's position is reached. After the probe is reached, the probe is removed from the queue. Thus, at any given point in time, the number of probes in the queue (referred to sometimes as "outstanding probes") provides an indication of the number of signaling instructions or message-related data yet to be processed which, in turn, can be used to determine whether or not an overload condition exists.

In one embodiment of the present invention, the number of detected probes and the threshold number are associated with traffic levels. Therefore, when the number of probes exceeds the threshold, it is an indication that the level of traffic has exceeded a threshold level of traffic and an overload condition exists.

The present invention envisions updating a fraction allowed based on, among other things, the results obtained from the comparison of the detected probe number to the threshold number. In one embodiment of the invention, the fraction allowed is reduced by a "multiplication value" when the detected number (denoted by n(t)) exceeds the threshold (denoted by $n_0$). For the most part, as long as the number of detected probes exceeds a threshold, an overload condition still exists. To quickly reduce such a condition the present invention uses the "multiplicative decrease" technique just described. At some point, however, the threshold will not be exceeded. In the past, existing techniques would then allow an immediate increase in traffic into a processor or its queue. Unfortunately, this can have the effect of immediately creating another overload condition.

To avoid this, the present invention envisions controlling the amount of traffic that can be processed once an overload condition has been eliminated. More specifically, in one embodiment of the invention, the fraction allowed is increased by an "additive value" when the detected number of probes is equal to zero and a residual delay, r, of a last inserted probe is less than a minimum residual delay, $r_{min}$. Said another way, when the number of probes detected is zero, it is assumed that the processor has processed all of the data associated with (e.g., contained in the queue before) all of the probes and, in fact, has processed most, if not all, of the data in the queue. At this point, any overload condition may have been eliminated. To make sure this is true, however, the present invention is also operable to check the time it took to process the last inserted probe. For example, if it took 3 ms between the time the last probe was inserted and the time it is processed (i.e., the residual time delay r) this may or may not indicate that a mild overload condition still exists. In an alternative embodiment of the invention the measured residual delay is compared to a minimum delay (e.g., 5 ms) to determine whether an overload condition exists. If the residual delay is less than the minimum, no overload condition exists and the fraction allowed can be increased by an additive value. In this manner, the amount of traffic to be processed by a processor is increased gradually as the fraction allowed is increased gradually (i.e., additively, not multiplicatively) only after it is determined that no "late blooming" overload condition has developed after the last probe has been removed from the queue.

Of course the possibility exists that the residual delay will exceed the minimum or the number of probes detected may fall somewhere in between zero and the threshold. In yet another embodiment of the invention, when either of these conditions occur, a "present" fraction allowed is maintained. More specifically, when the detected number of probes is greater than zero and less than, or equal to, the threshold or when the detected number is equal to zero and the residual delay of the last inserted probe is greater than the minimum residual delay then the fraction allowed will be "updated", so-to-speak, by simply maintaining the same fraction allowed, i.e., no change is made to the fraction allowed.

It is believed that the techniques set forth above are far simpler to implement than Occupancy-based techniques because the calculation of occupancy values can be very complex depending upon the nature of the operating system used by a communications switch or the like. In addition to being simpler to implement, the inventive techniques are very flexible. For example, many of the parameters used to adjust the fraction allowed may be varied to meet the requirements of a specific user or desired condition (e.g., quicker response to overload, a more controlled return of traffic, etc.). More specifically, in alternative embodiments of the present invention, the threshold number, minimum residual delay, measurement interval, multiplication value and additive value may each be varied to obtain different desired results.

FIG. 1 depicts a flow diagram of the technique(s)s discussed above for eliminating an overflow condition while controlling the return of traffic after the condition has been substantially eliminated. In step 201, one or more probes are inserted at equally spaced times $t_1, t_2, \ldots$, with the interval between each probe time as $\Delta$. In step 202, at a certain probe time t, a fraction allowed is updated as follows. If n(t) is a number of outstanding probe counts and (r) is the residual delay experienced by the last delayed probe, then when $n(t) \geq n_0$ (a threshold) and $n(t) \geq n(t-1)$, the fraction allowed is updated as: $f_{new} = b(n(T))f_{old}$, where b(n) is a multiplicative decreasing function. However, if n(t)=0 and $r < r_{min}$ (the minimal delay) then $f_{new} = \min(f_{old} + a(n), 1)$, where a is an additive increment function.

Figure 2:
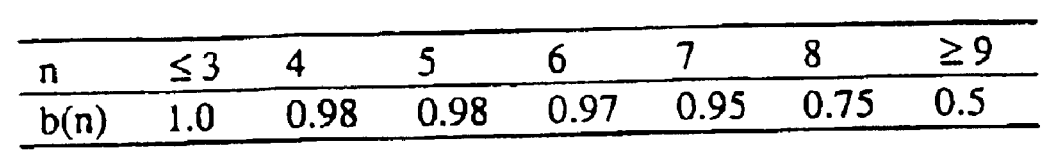

In yet a further embodiment of the invention, the multiplication value may in actuality comprise a range of values, where one value is selected from the range to decrease the fraction allowed based on the number of probes detected. FIG. 2 depicts some examples of multiplication values, b(n), for a given number of detected probes, n. Referring to FIG. 2, when the number of outstanding probes is more than 3 the multiplication value is a value less than one. Once the number of outstanding probes is equal to or greater than 9 the fraction allowed is multiplied by substantially 0.50.

In experiments completed by the inventors, a default interval or time between probes was set to 100 ms, the additive value, a, was set to a default value of 0.01 and the minimal residual value $r_{min}$, was set to a default value of 5 ms.

Figure 3:
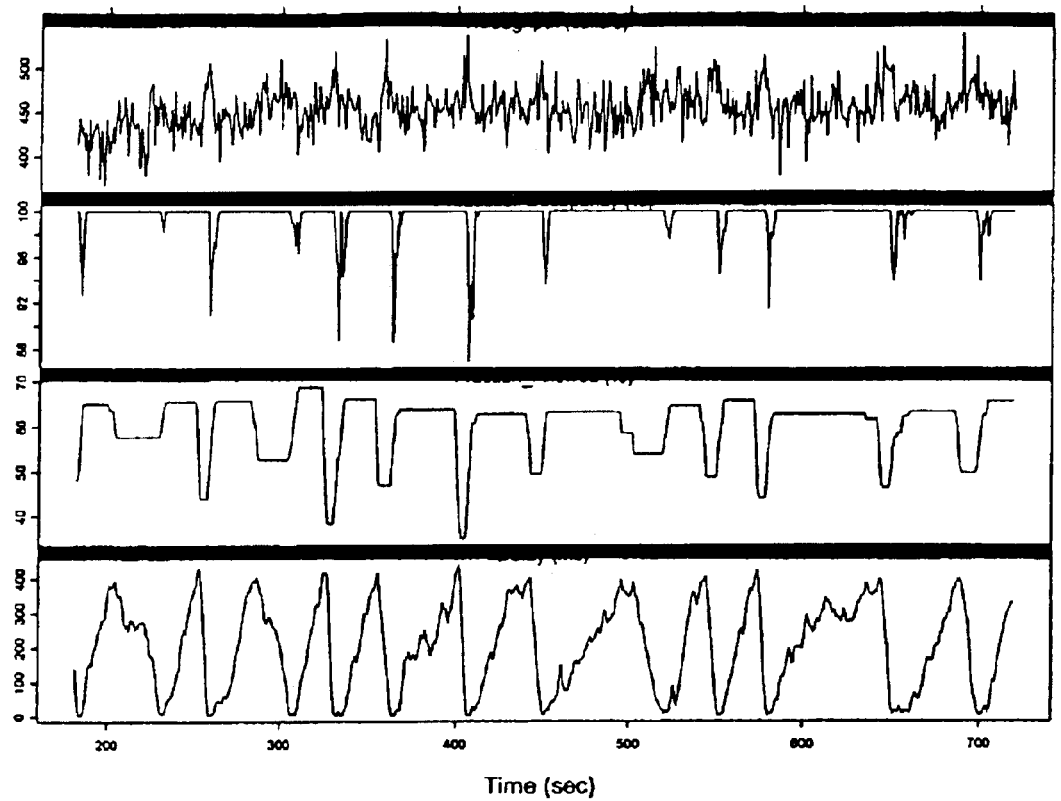
FIGS. 3–5 depict graphical results of simulations completed using overload control techniques envisioned by one or more embodiments of the present invention.
Figure 4:
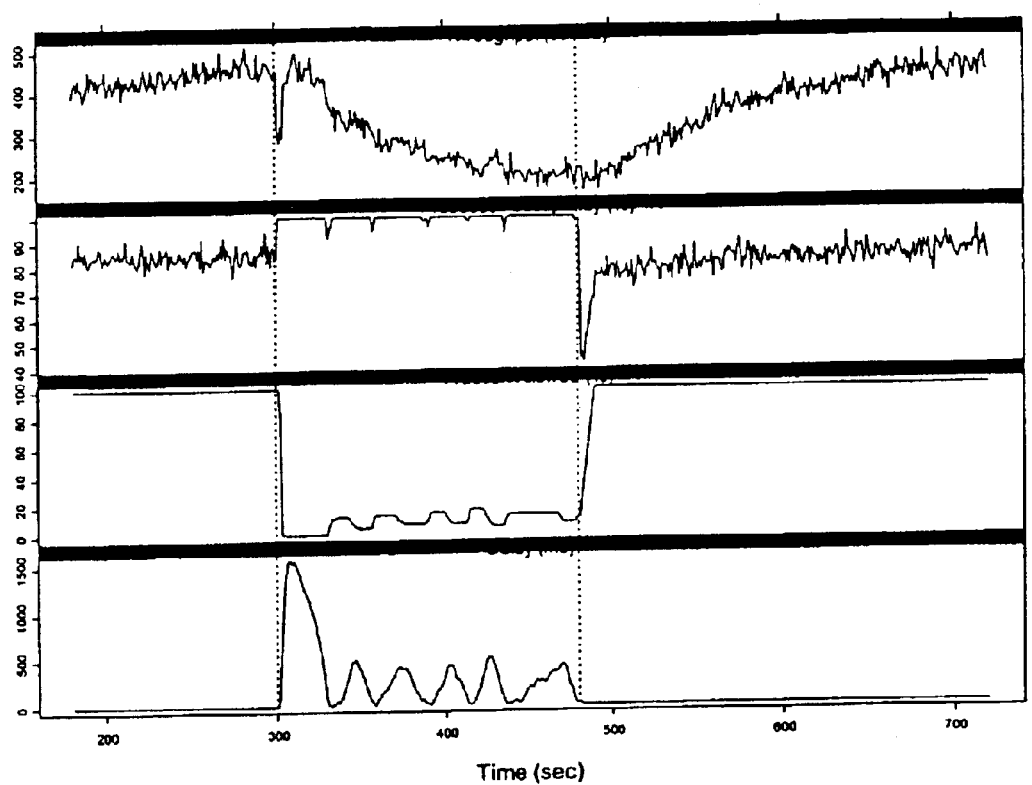
Figure 5:
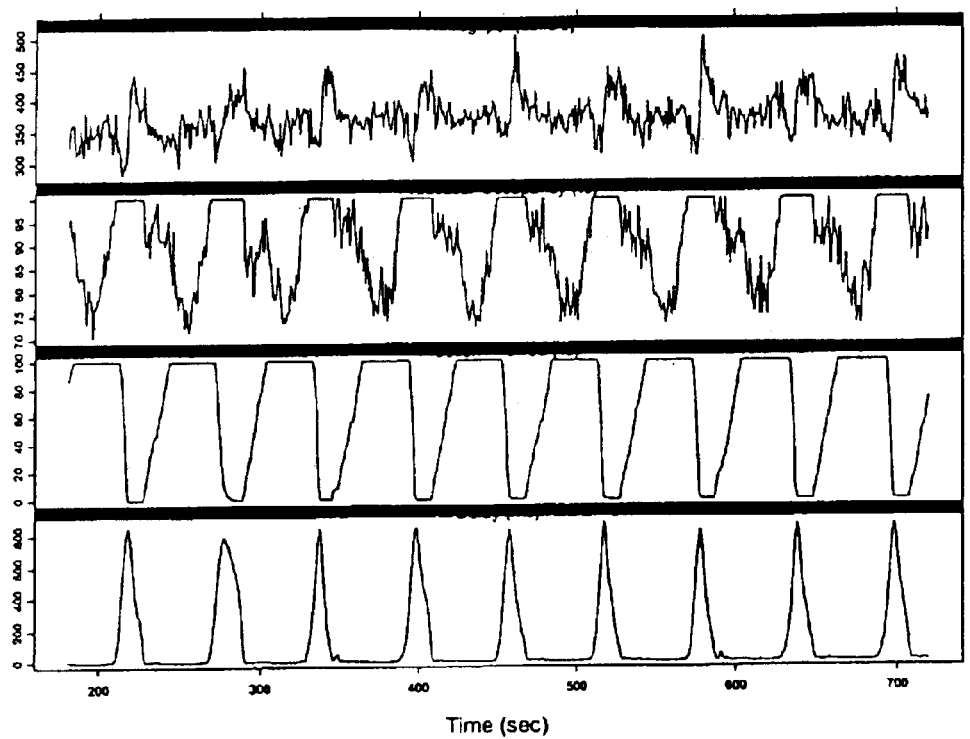

FIGS. 3–5 depict graphical results of simulations completed using the above-described overload control techniques. It should be understood that theses graphs are not intended to demonstrate the most optimal results that can be achieved by the inventive techniques (e.g., when it comes to avoiding a quick return to an overload condition). Rather, they are just examples of some results which were observed.

FIG. 3 depicts results from a steady-state overload; FIG. 4 depicts results where ramp-up and ramp-down conditions are simulated; and FIG. 5 depicts results where an amount of traffic periodically causes a processor to fluctuate in and out of an overload condition. Under the steady-state overload conditions depicted in FIG. 3, the inventive techniques demonstrate some low frequency oscillations, with a delay varying from 0 to 400 ms and a corresponding fluctuation in the fraction allowed value. These oscillations, however, are much less severe than those experienced by other techniques (e.g., so-called "on-off" techniques).

The graphs in FIG. 4 show that the techniques envisioned by the present invention provide quick response to an overload condition, though there is a spike in the amount of delay up to 100 ms. Nonetheless, the inventive techniques allow a processor to rapidly stabilize its performance similar to the steady-state conditions shown in FIG. 3.

Figure 6:
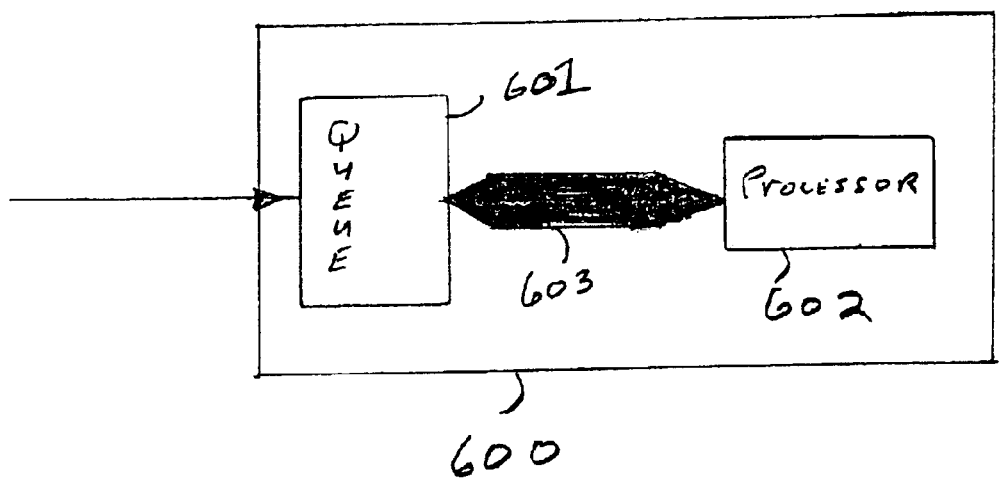
FIG. 6 depicts one example of a simplified block diagram of a device operable to carry out the overload control techniques provided by the present invention.

The present invention has been described above with reference to specific examples. It is next to impossible to set forth each and every example envisioned by the present invention. For example, FIG. 6 depicts one example of a simplified block diagram of a device 600, such as a network switch, operable to carry out the overload control techniques provided by the present invention. Switch 600 is shown comprising queue 601 and processor 602 connected via data or signaling bus 603. Though shown as separate sections, these two sections may be combined or broken down further into additional sections. It should be understood that any one of a number of different types of devices may be used to carry out the techniques described above, such as a network switch. In sum, the scope of the present invention is not limited by the examples given above, but is defined by the claims that follow.

We claim:

1. A method for controlling a level of traffic in communications network comprising:

placing one or more probes into a queue of a device within a communications network, the queue comprised of incoming data;

detecting the number of probes after a measurement interval;

comparing the detected number to a threshold number; and updating a fraction allowed based on the comparison, wherein the fraction allowed is reduced by a multiplication value when the detected number exceeds the threshold, or increased by an additive value when the detected number is equal to zero and a residual delay of a last inserted probe is less than a minimum residual delay.

2. The method as in claim 1 further comprising maintaining a present fraction allowed when the detected number is greater than zero and less than, or equal to, the threshold or when the detected number is equal to zero and the residual delay of the last inserted probe is greater than the minimum residual delay.

3. The method as in claim 1 further comprising varying the threshold number.

4. The method as in claim 1 further comprising varying the minimum residual delay.

5. The method as in claim 1 further comprising varying the measurement interval.

6. The method as in claim 1 further comprising varying the multiplication value.

7. The method as in claim 1 further comprising varying the additive value.

8. The method as in claim 1 wherein the multiplication value comprises a range of values, wherein the method further comprises selecting one value from the range based on the detected number.

9. The method as in claim 1 wherein each probe comprises a packet.

10. A device for controlling a level of traffic in a communications network, the device operable to:

place one or more probes into a queue comprised of incoming data;

detect the number of probes after a measurement interval;

compare the detected number to a threshold number; and update a fraction allowed based on the comparison, wherein the fraction allowed is reduced by a multiplication value when the detected number exceeds the threshold, or increased by an additive value when the detected number is equal to zero and a residual delay of a last inserted probe is less than a minimum residual delay.

11. The device as in claim 10 further operable to maintain a present fraction allowed when the detected number is greater than zero and less than, or equal to, the threshold or when the detected number is equal to zero and the residual delay of the last inserted probe is greater than the minimum residual delay.

12. The device as in claim 10 further operable to vary the threshold number.

13. The device as in claim 10 further operable to vary the minimum residual delay.

14. The device as in claim 10 further operable to vary the measurement interval.

15. The device as in claim 10 further operable to vary the multiplication value.

16. The device as in claim 10 further operable to vary the additive value.

17. The device as in claim 1 wherein the multiplication value comprises a range of values, and the device is further operable to select one value from the range based on the detected number.

18. The device as in claim 10 wherein each probe comprises a packet.

* * * * *